United States Patent [19]

Bergman et al.

[11] Patent Number: 5,383,218
[45] Date of Patent: Jan. 17, 1995

[54] DIRECT CURRENT MELTING FURNACE WITH CONTROL OF DEFLECTION OF THE ELECTRIC AGE

[75] Inventors: Kjell Bergman; Kenneth Lundstrom, both of Västerås; Staffan Granstrom, Öjebyn, all of Sweden; Gensini Gianni, S. Stefano; Giovanni Coassin, Pordenone, both of Italy

[73] Assignee: Danieli & C. Officine Meccanicue SpA., Buttrio, Italy

[21] Appl. No.: 94,338

[22] Filed: Jul. 20, 1993

[30] Foreign Application Priority Data

Jul. 31, 1992 [IT] Italy .......................... UD92A000127
Jul. 31, 1992 [IT] Italy .......................... UD92A000128
Dec. 24, 1992 [IT] Italy .......................... UD92A000185

[51] Int. Cl.6 ........................................ H05B 7/144
[52] U.S. Cl. ........................................ 373/107; 373/64; 373/108
[58] Field of Search .................. 373/64, 60, 61–62, 373/65, 72, 102, 107, 108; 363/70, 88

[56] References Cited

U.S. PATENT DOCUMENTS

| | | | |
|---|---|---|---|
| 4,495,625 | 1/1985 | Heberlein et al. | 373/107 |
| 4,725,939 | 2/1988 | Boisdon | 363/70 |
| 5,138,630 | 8/1992 | Suga | 373/107 |
| 5,191,592 | 3/1993 | Janiak et al. | 373/107 |
| 5,237,585 | 8/1993 | Stenkvist | 373/72 |

FOREIGN PATENT DOCUMENTS

| | | |
|---|---|---|
| 225200 | 9/1986 | European Pat. Off. . |
| 255793 | 7/1987 | European Pat. Off. . |
| 258101 | 7/1987 | European Pat. Off. . |
| 473809 | 9/1990 | European Pat. Off. . |
| 474883 | 3/1991 | European Pat. Off. . |
| 4035233 | 5/1991 | Germany . |
| 4118756 | 12/1992 | Germany . |

OTHER PUBLICATIONS

Patent Abstracts of Japan vol. 14, No. 519 (M-1048) 14 Nov. 1990 & JP-A-22 17 783 (Daido Steel) Aug. 30, 1990.
Patent Abstracts of Japan vol. 15, No. 81 (M-1086) 25 Feb. 1991 & JP-A-23 02 581 (Daido Steel) 14 Dec. 1990.
Patent Abstracts of Japan vol. 14, No. 519 (M-1048) 14 Nov. 1990 & JP-A-22 17 782 (Daido Steel) 30 Aug. 1990.

*Primary Examiner*—Mark H. Paschall
*Assistant Examiner*—Tu Hoang
*Attorney, Agent, or Firm*—Antonelli, Terry, Stout & Kraus

[57] ABSTRACT

Direct-current smelting furnace with control of deflection of the electric arc, which comprises an upper electrode (13) with relative return-flow lines and a plurality of bottom electrodes (11) positioned on the hearth of the furnace (12) and arranged in two or more assemblies, each assembly having its own controlled supply line connected to its own transformer (16), there being included downstream of each transformer (16) its own thyristor rectifier assembly (17) associated with its own means to control voltage (26), current (24) and firing angle (23), at least the lines supplying the bottom conductors (32) being at least partly screened in the vicinity of the melting furnace (12)

11 Claims, 4 Drawing Sheets fig. 1 fig.9 fig.10 fig.8

DIRECT CURRENT MELTING FURNACE WITH CONTROL OF DEFLECTION OF THE ELECTRIC AGE

BACKGROUND OF THE INVENTION

This invention concerns a direct current melting furnace with control of deflection of the electric arc:

To be more exact, the invention concerns a system which enables the position of the electric arc to be controlled and conditioned with very great accuracy in a DC. melting furnace according to the requirements which may arise from time to time during a melting operation.

In a DC electric-arc melting furnace the electric arc is generated between an upper electrode in a substantially central position and a lower electrode system located on the hearth of the furnace.

A first type of lower electrode system consists of the so-called conductive hearth, in which the direct current, so as to reach the scrap or molten bath in the furnace, passes through a layer of refractory material, to which is added, or which is replaced by, a conductive material, so that the current is discharged onto a metallic plate and passes thence to the rectifier and transformer.

Another embodiment is the so-called single bar type, in which the current flows from the electrode on the bottom through the molten bath and/or scrap and thence through the arc to the upper electrode.

The embodiment with the conductive hearth entails the problem of affecting the whole hearth of the furnace by passage of the current and requires a continuous control of the temperature over the whole surface involved and cooling means over a very wide surface. Localized wear of the hearth of the furnace may lead to variations in the thickness of the bottom of the same and therefore in the conductivity of the refractory material, thus causing unbalances in the distribution of the current, and these unbalances in turn may lead to deflection of the arc.

This fact necessitates a frequent control of the conditions of the furnace hearth and involves frequent stoppages of processing and high maintenance costs.

The conductors themselves and the metallic masses included in cooperation with the furnace generate distortions which affect the operation and position of the arc.

Moreover, both the above embodiments have the common feature of including one single electrode on the bottom to the furnace, whereby it is not possible to control random and uncontrolled deflections of the arc generally caused by interferences of the magnetic fields in the system of conductors outside the furnace.

Furthermore, these embodiments do not enable the electric arc to be directed towards desired zones inside the furnace when so required by special working conditions.

The state of the art includes melting furnaces which comprise a plurality of bottom electrodes, arranged advantageously in assemblies of two, four or more and acting as lower electrodes.

The state of the art covers also the ability to control these bottom electrodes separately by providing a specific feeder unit comprising at least one transformer and at least one assembly of thyristors for each of the bottom electrodes.

This lay-out, as is disclosed in DE-A-4.035.233, DE-A-4.118,756, EP-A-0225200 and EP-A-0474883, makes possible, by means of individual adjustments, a better control of deflection of the arc which strikes between the upper electrode and bottom electrodes.

The melting furnaces of the state of the art, however, do not overcome satisfactorily the problem of controlling very accurately the vertical positioning of the arc nor the problem of directing the arc towards desired zones of the furnace, because the control is carried out by an open loop control system and because the furnaces do not solve effectively the problem of elimination of interferences caused by the magnetic fields induced by the conductors outside the furnace.

In this connection this latter problem of the state of the art has been tackled with various systems.

A first system, disclosed in EP-A-0258101 for instance, consists in arranging the conductors connected to the bottom electrodes in such a manner that, for instance by using two conductors for each electrode, the magnetic field generated by the first of those conductors affects a well determined zone of the furnace, whereas the magnetic field generated by the other conductor affects the other zone of the furnace, thus endeavouring to balance and cancel the effects of those magnetic fields, but this system is hard to set up and regulate and does not lead to the pre-set results.

A second system, also disclosed in EP-A-0258101, consists in arranging about or below the hearth of the furnace a coil which generates a magnetic field such as will balance, or unbalance in a desired manner, the magnetic fields generated by the conductors, thus cancelling their effects and preventing deflection of the arc, but this system too is hard to set up, does not lead to the pre-set results, entails an increase in energy consumption not justified by the results and restricts considerably in both the upper and lower zones the space available for the work to be carried out on the melting furnace.

Moreover, all the systems intended to minimise disturbances have always been concerned with the bottom electrodes and have never considered the disturbances created by the conductors connected to the upper electrode nor those created by the metallic masses used in the equipment, or in the neighbourhood, of the furnace.

SUMMARY OF THE INVENTION

The present applicants have designed, tested and embodied this invention to overcome the shortcomings of the state of the art and to achieve further advantages.

One purpose of this invention is to provide a DC melting furnace in which it is always possible to control and condition the position of the arc on the basis of the specific requirements occurring within the electric furnace.

Another purpose of the invention is to ensure an accurate control of deflection of the arc by minimising the disturbances caused by the magnetic fields generated by the conductors outside the furnace.

A further purpose of the invention is to provide a closed loop control system which enables the deviations of the actual deflection of the arc in relation to the desired working parameters to be corrected.

During the functioning of the DC melting furnace working situations occur whereby it is advantageous to have the electric arc in a perfectly vertical position, whereas other working situations take place in which it is convenient to deflect the electric arc from a vertical position.

A typical example of the latter situation is provided by a furnace which has its tapping hole displaced from the centre of the furnace.

In this case, it is convenient to direct the arc, at about the time of tapping and during the tapping, towards the tapping hole so as to concentrate the energy in the zone of build-up of the molten material to be cast. This contrivance makes possible an increase of the temperature of the material to be cast by some tens of degrees centigrade.

Another case is the one where the furnace is fed continuously or discontinuously with metallic scrap, which is deposited on the molten material to be cast. In this case too it is convenient to direct the arc towards the scrap thus charged so as to produce quick melting of the metal and a saving of the supply of electricity.

Yet another case is that where the furnaces are equipped with means to inject gases, such as oxygen or methane, or fuels such as carbon, from the hearth of the furnace. This injection is provided to ensure stirring of the bath and to obtain the reaction of oxidation of the carbon in the metallic mass. The injection causes turbulences in the bath, and the turbulences alter the length of the arc in a discontinuous manner, thus provoking disturbances (flicker) in the supply network.

During the introduction of the stirring gases and possibly of other materials it is convenient in this case to deflect the arc into the less disturbed zone, thus enabling the disturbances of the network to be prevented or at least reduced.

The invention arranges to supply each assembly of bottom electrodes with suitable currents, which are generally different from each other.

In particular, each electrode or assembly of electrodes is governed by its own thyristor rectification unit, the firing angle of which conditions the value of current fed to the electrode itself.

The currents at each electrode are calculated for the desired deflection of the electric arc.

The individual control of the current at each electrode enables the control of the vertical positioning of the arc to be improved, or enables the current at the sides of the furnace to be unbalanced.

This individual control of the current may enable, for instance, the electric arc to be rotated along one or more circumferences, the electrodes being fed separately according to a function of time and according to a partial or total, continuous or alternating sequence. This ability is especially advantageous when it is desired to improve the melting of the scrap at the sidewalls of the furnace.

So as to control the arc deflection accurately, it is necessary, besides controlling the bottom electrodes individually, to minimise the effect of the magnetic fields generated outside the furnace. This can be accomplished by providing a screening of the conductors connected to the electrodes located at the bottom of the furnace and also, advantageously, of the conductors positioned on the upper electrode arm.

The screening of the conductors located at the bottom is provided, for instance, by screens having a shape at least partly surrounding the conductors and positioned thereabout and open towards the periphery of the furnace.

The screens advantageously are U-shaped, L-shaped or flat or may be embodied by making use of the structure itself of the furnace.

The screening of the conductor or conductors connected to the upper electrode may be provided by fitting a screen of a suitable shape to the upper electrode arm, for instance.

Both the screens for the bottom conductors and those for the upper conductors are made of a ferromagnetic material to concentrate the magnetic flow generated by the strong currents in the conductors themselves.

The individual adjustment of the currents in the bottom electrodes is carried out typically with a setting at the start of work of the furnace and is kept during the whole period of that work.

The current adjustment parameters which affect the position of the arc are generally worked out on the basis of experimental trials.

This adjustment with an open loop system may be not very accurate owing to the difficulty in forming a model of the real behaviour of the furnace and in producing an efficient regulator.

With a view to improving the performance of the system it is therefore possible to implement a closed loop control by equipping the furnace with a system of transducers which detect the deflection of the arc and generate a signal for the control system.

This signal is processed and returned to the input of the system as a feedback signal to correct the values of current fed to the electrodes.

According to a variant the adjustment is carried out at different moments in the melting cycle with differentiated adjustments. For instance, it may be convenient during a melting cycle to deflect the arc towards the scrap during the actual smelting step, whereas it is convenient to deflect the arc towards the tapping hole during the subsequent casting step.

The system of control with thyristors works in parallel with the system of control of the positioning of the upper electrode and may be deemed to be a system to adjust the voltage with a loop of limitation of the current.

The system to control the positioning of the upper electrode ensures the proper positioning of that electrode so as to obtain the arc voltage value selected for the actual operations.

The system to control with thyristors the voltage and current is by its very nature a quick response to disturbances which occur in the electricity supply network, whereas the system to position the upper electrode, although provided with servo-mechanisms and optimised hydraulic components, provides a slower response to those disturbances.

In the event of disturbances, therefore, the first action will be taken by the thyristor regulation system and thereafter the desired working conditions will be restored by the system that positions the upper electrode

BRIEF DESCRIPTION OF THE DRAWINGS

The attached figures are given as a non-restrictive example and show some preferred embodiments of the invention as follows.

DETAILED DESCRIPTION OF THE PREFERRED EMBODIMENTS

The reference number 10 in the attached figures denotes a system to control the current of bottom electrodes 11 in a DC melting furnace 12.

In this example the melting furnace 12 is equipped with an upper electrode 13 located at a substantially central position in the furnace 12.

The upper electrode 13 is associated in a known manner with a known system 29 for hydraulic or mechanic adjustment of the position of the upper electrode 13.

Figure 1:
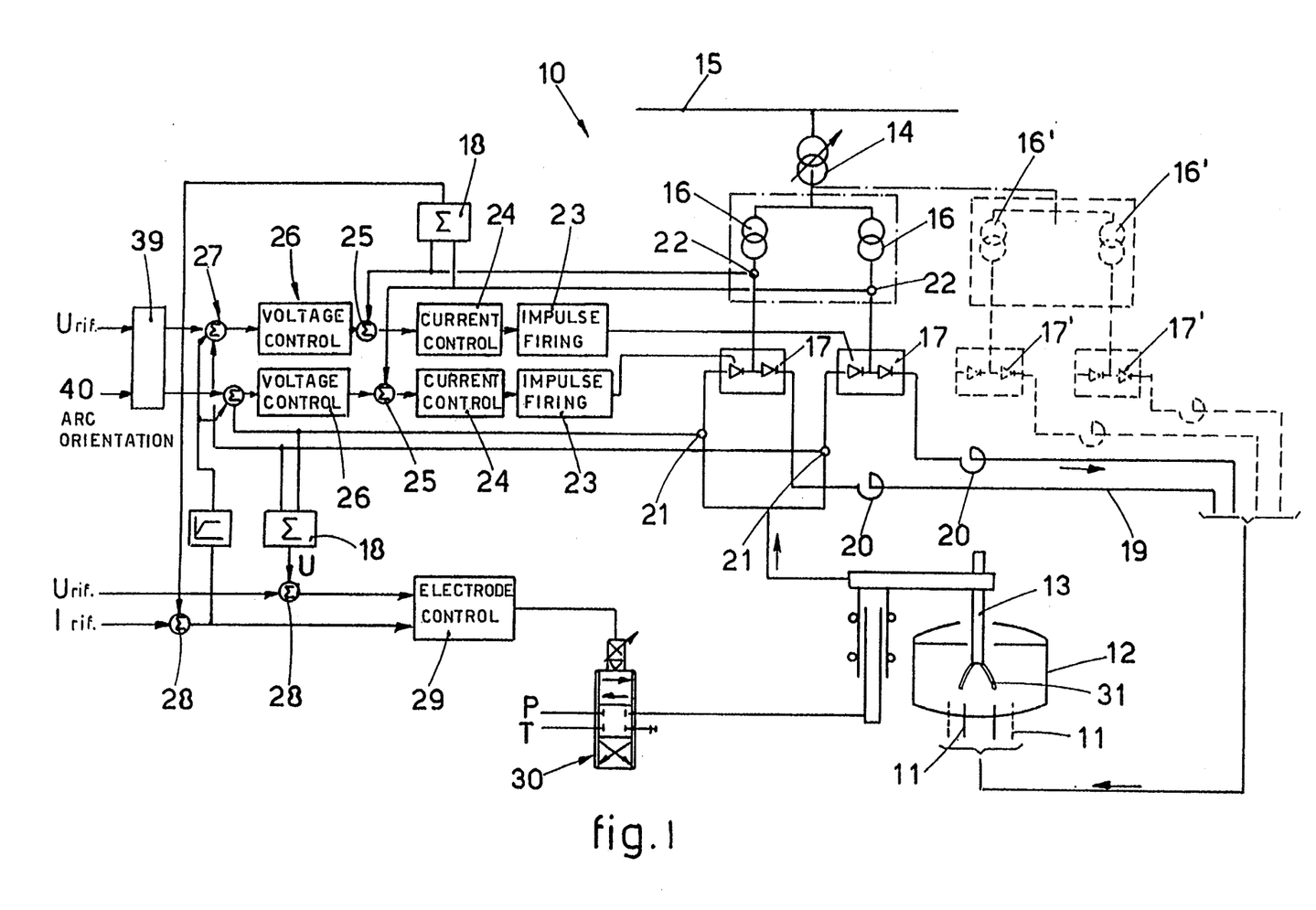
FIG. 1 is a diagram of one form of the lay-out of the system to control the deflection of the electric arc according to the invention.

The control system 10 according to the invention arranges to control with separate adjustment blocks the current in each of the bottom electrodes 11 which compose the lower electrodes of the melting furnace 12.

Where there are two bottom electrodes 11, the circuit is of the type shown in FIG. 1 with continuous lines.

Where there are four bottom electrodes 11, the circuit includes also a further block of transformers 16' and a pair of thyristor rectifiers 17', as shown with lines of dashes in FIG. 1.

This further pair of thyristor rectifiers 17' includes feeder and adjustment circuits analogous to those of the thyristor rectifiers 17.

The electricity supply line of the furnace 12 comprises an autotransformer 14 with tap changer under load connected to the electricity supply network 15 to regulate the input voltage so as to reduce harmonic distortion and the reactive power generated by the rectification system.

This autotransformer 14 with tap changer under load is connected to one fixed-ratio triplex-winding transformer 16 for each bottom electrode 11.

The transformers 14–16 can be grouped in one single block or be separate transformers.

Each of the fixed-ratio triplex-winding transformers 16 feeds an assembly of thyristor rectifiers 17, each of which is associated with a bottom electrode 11.

These assemblies of thyristor rectifiers 17 are governed individually by circuits 26 that adjust and control the voltage and by circuits 24 that adjust and control the current.

To be more exact, the voltage adjustment circuit 26 provides the set-point value of voltage in accordance with the selected value of the tap changer of the autotransformer 14.

The output of the voltage adjustment circuit 26 is used as a set-point for current by the current adjustment circuit 24.

This set-point value is compared by comparators 25 with the value read in the line by current measuring instruments 22.

The value of the difference is sent to the current adjustment circuits 24 which control impulse firing generators 23 of the thyristor rectifiers 17 so as to adjust the firing angle of the thyristor rectifiers 17.

A feedback signal is also fed to the voltage adjustment circuit 26 by voltage measuring instruments 21. This signal taken from the supply line is compared by comparators 27 with the reference value so as to alter that reference value in such a way as to maintain always the maximum input power at the furnace 12.

By acting separately on the firing angle of the individual thyristor rectifier blocks 17 it is possible to balance the supply current of the bottom electrodes 11 so as to ensure under all working conditions a vertical position of the electric arc 31 or to unbalance the currents in the bottom electrodes 11 so as to direct the electric arc 31 towards a desired zone.

In this connection the control system 10 includes an input calculation circuit 39 which, given a certain desired deflection of the electric arc 31 transmitted as an input signal 40 to the calculation circuit 39, determines the unbalance of currents in the individual bottom electrodes 11 required to obtain that deflection.

This enables the electric arc 31 to be deflected towards one side of the furnace, for instance, on the basis of the working requirements which may arise from time to time during the melting cycle.

With the control system 10 according to the invention it is possible, for instance, to determine rotation of the electric arc 31 about the upper electrode 13 and to regulate in a differentiated manner according to a time function the supply current to the bottom electrodes 11.

This option enables the melting of the scrap along the sidewalls of the furnace 12 to be improved.

Figure 2:
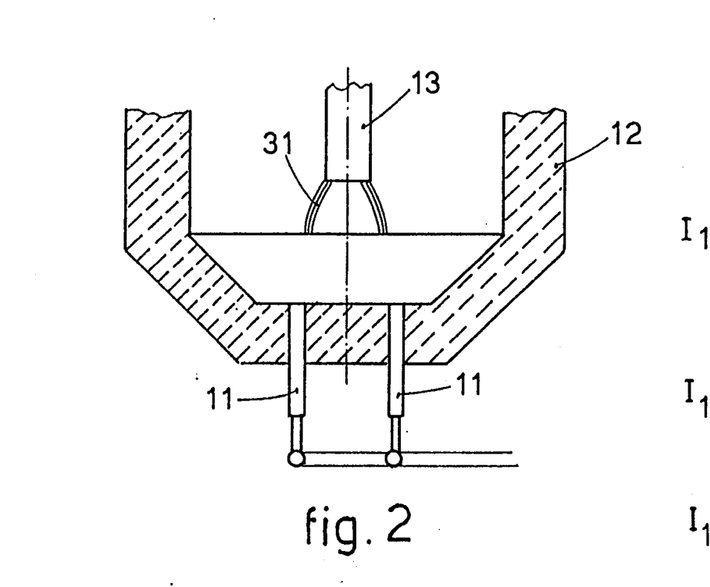
FIG. 2 shows a cross-section of an electric furnace with an upper electrode, bottom electrodes and an electric arc.
Figure 3:
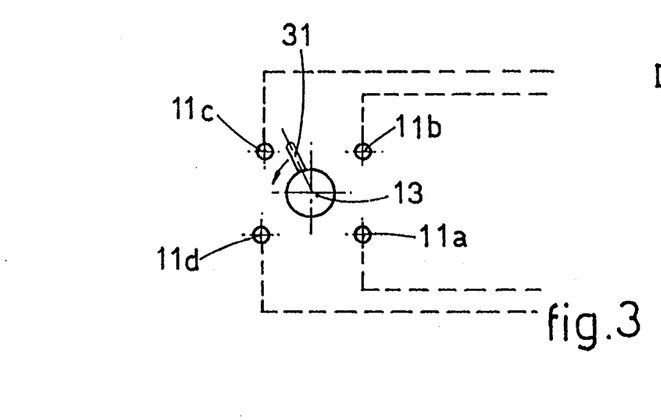
FIG. 3 is a partial diagrammatic plan view of the lay-out of FIG. 2, in which the variable position of the electric arc between the upper electrode and bottom electrodes is made clear.
Figure 4:
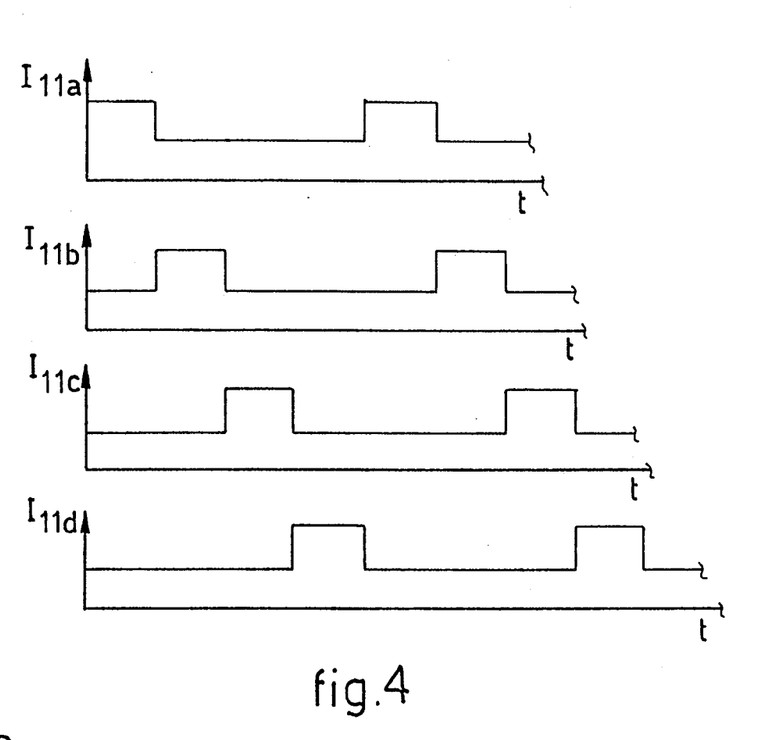
FIG. 4 shows with a graph a possible development of the currents in the four bottom electrodes in executing the option shown in FIG. 3.

FIGS. 2, 3 and 4 show this option in connection with the use of four bottom electrodes 11, namely 11a, 11b, 11c and 11d, according to a complete, continuous rotation.

If the four bottom electrodes 11 are fed in the manner shown graphically in FIG. 4, the electric arc 31 will be set in rotation along a circumference having as its axis the upper electrode 13 (FIG. 3).

A plurality of circumferences can be envisaged and the electric arc 31 can be displaced along one circumference or another or along more than one circumference.

Naturally, if a plurality of circumferences of rotation are arranged, enough suitable bottom electrodes 11 will be provided for each circumference.

The displacement of the electric arc 31 will take place in relation to the steps of current imparted in a continuous, alternating and sequential manner between one bottom electrode 11 and the immediately adjacent electrode with a clockwise or anti-clockwise cycle according to the working requirements.

This control system 10 according to the invention also provides a quick response to disturbances which may occur during normal working of the furnace 12.

In a successive step the control system 29 of the positioning of the upper electrode 13 acts to restore the optimum working conditions of the furnace 12.

In fact, the feedback signal is taken from the line and sent to the control system 29 of the positioning of the upper electrode 13. This signal is first averaged, or the mean value is calculated for all the branches by means of summation instruments 18.

This mean value is sent to the control system 29, and this system 29 compares that value by means of comparators 28 with the reference values of voltage and current.

On the basis of the differences found the control system 29 actuates the positioning valve 30 so as to adjust the positioning of the upper electrode 13 as required and to restore optimum working conditions of the furnace 12.

Levelling reactors 20 are included advantageously on the supply line of the bottom electrodes 11 along the supply conductors 19 and eliminate peaks and disturbances of the supply signal.

According to a variant of the invention a closed loop control is provided to correct any deviations of the deflection of the electric arc 31 from the desired value.

Figure 9:
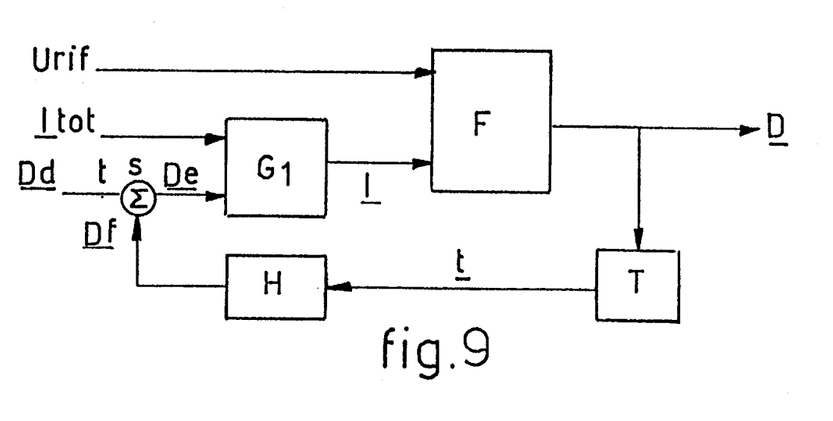
FIGS. 9 and 10 are two possible block diagrams of feedback control of the arc deflection according to the invention.
Figure 10:
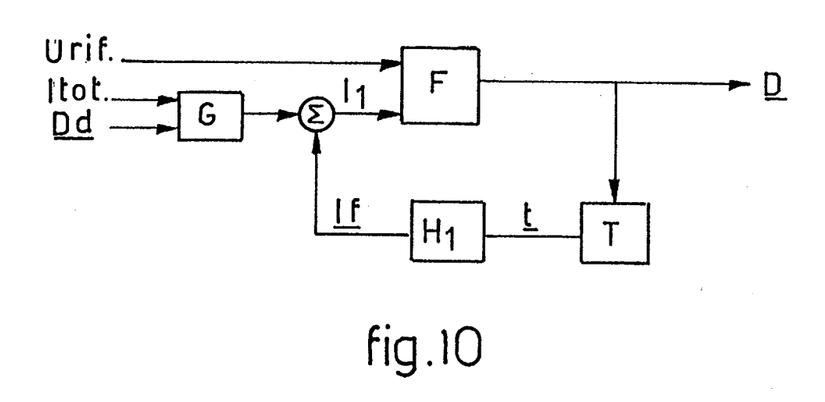

FIGS. 9 and 10 show two possible block diagrams for the feedback control. In that of FIG. 9 the vector of current "I" consisting of the currents fed to the individual bottom conductors 32 is calculated by the block "G1" according to the desired deflection of the arc "Dd" and to the overall required current $I_{tot}$.

The vector "I" together with the necessary reference voltage Urif is sent to the pilot system "F" of the bottom electrodes 11; the system "F" is a schematization of the supply and conversion system and the elements that adjust the currents and voltages.

The deflection actually obtained is "D", which is generally different from "Dd".

According to the invention the furnace 12 is equipped with a system "T" of transducers, the output signal of which, the vector "t" depends on the actual deflection "D" of the arc 31.

The signal "t" is processed by the block "H" and returned to the input as a feedback signal "Df".

The cycle is closed with the input summation means "S", whence is obtained the error signal "De=Dd-Df", which pilots the calculation block "GI" that fixes the currents "I" required to have the required deflection.

The system of transducers "T" may consist of sensors of a magnetic or electrical field, thermal detectors or optical detectors employed singly or in combination with each other.

The sensors may be positioned outside the furnace, in the sidewalls or in the roof of the same.

In particular, the thermal sensors can be associated advantageously with cooling panels so as to read the changes of temperature in the panel and/or in the outflow water.

According to the variant shown in FIG. 10 the vector "t" is sent to a block "HI" which calculates directly the vector of current "If" of error so as to correct in a closed loop system the deviations of the deflection from the required value.

This closed-loop adjustment system can be embodied in such a way as to control the position of the arc 31 about a desired position as an average.

Figures 5, 6:
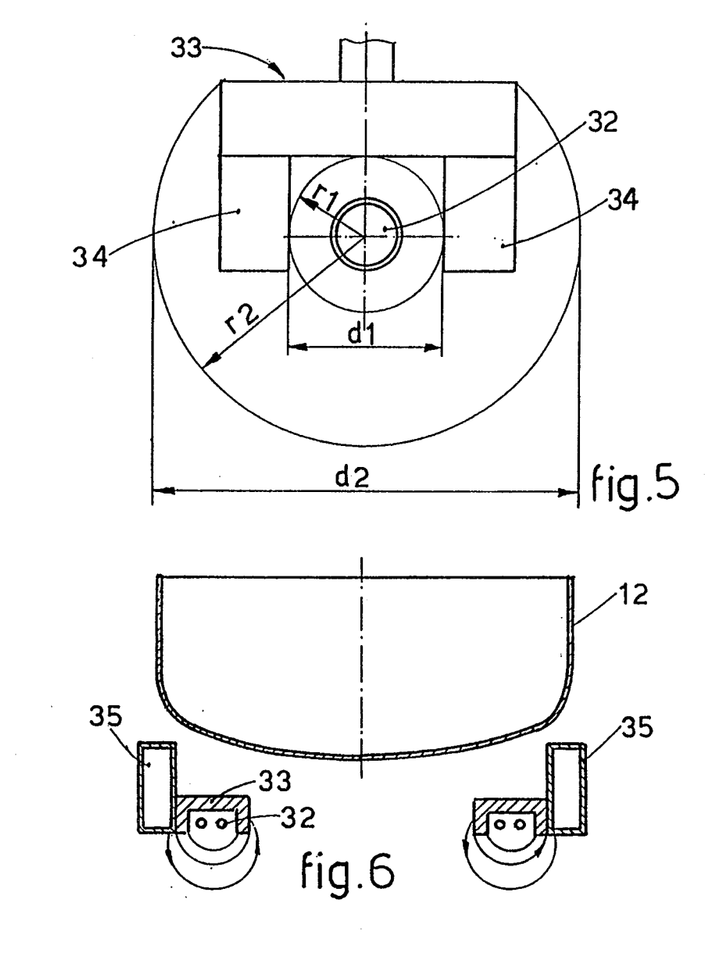
FIG. 5 shows in an enlarged scale a cross-section of a screened bottom conductor.
FIG. 6 shows in an enlarged scale a possible variant of the screening of the bottom conductors according to the invention.

In the furnace 12 according to the invention the conductors 32 that connect the bottom electrodes 11 are screened, in this case, by a metallic section 33 of a ferromagnetic material, or a material of a high magnetic permeability, which has the purpose of containing the magnetic field which the conductors 32 generate when an electric current is passed through them.

The ferromagnetic section 33 has a shape that partly enfolds the conductors 32 to be screened and is advantageously U-shaped, L-shaped or crescent-shaped or has another suitable, partly surrounding shape.

According to a variant the ferromagnetic section 33 consists of modular elements.

In the example of FIG. 5 the magnetic field stays contained substantially between the two parallel walls 34 of the U-shaped ferromagnetic section 33 acting as a screen, thus preventing the magnetic field causing within the furnace 12 any unbalances which deviate the arc 31.

The ferromagnetic section 33 is advantageously fitted so as to be open downwards.

According to a variant the U-shaped ferromagnetic section 33 is fitted with its sidewalls 34 facing sideways and open towards the periphery of the furnace 12 so as to achieve effective screening of the conductors 32 in relation to the arc 31.

By eliminating in this way the effects of the external magnetic fields, the arc 31 which is established between the upper electrode 13 and the charge is positioned correctly and substantially vertically within the furnace 12 according to the invention.

Moreover, the screening enables the desired deflection or movement of the arc 31 to be achieved with greater accuracy by acting in a suitable manner on the thyristor assemblies 17.

According to a variant the section 33 is combined with a frame that constitutes a platform 35 of the furnace 12. In this case the section 33 can also take on shapes other than a U-shape so as to suit its constructional embodiment in combination with the platform 35 of the furnace 12.

A possible embodiment is shown in FIG. 6, in which the section 33 consists of modular elements so as to form, together with an element of the platform 35, a screen for the conductors 32.

Figure 7:
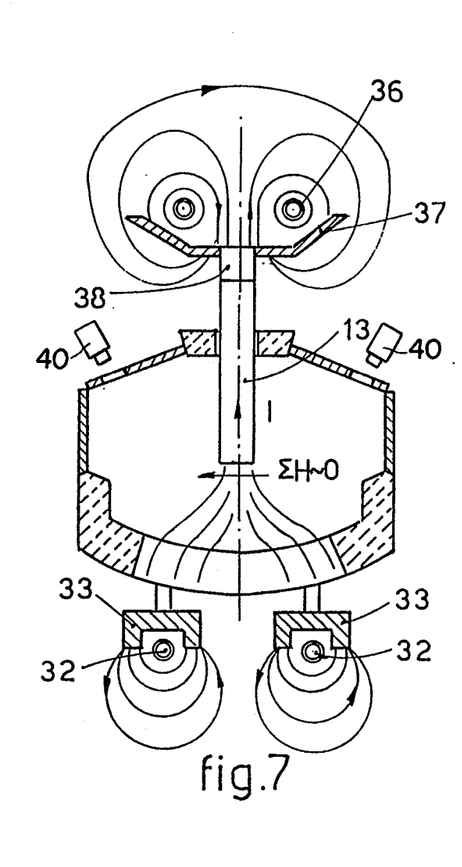
FIG. 7 is a front view of an electric furnace according to the invention employing the screening of the bottom conductors and upper conductors.
Figure 8:
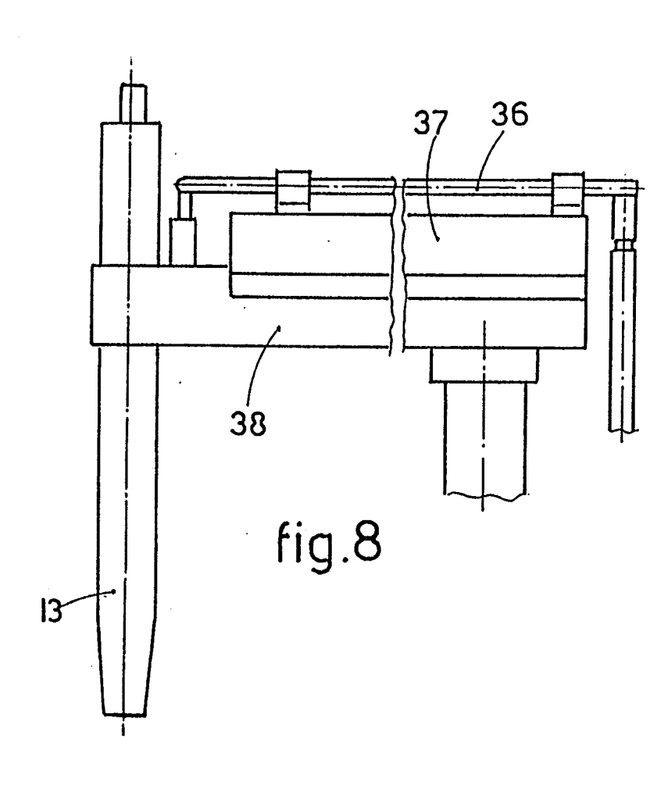
FIG. 8 is a side view in an enlarged scale of a detail of the screening of the upper conductors of the melting furnace according to the invention.

According to a variant shown in FIG. 7 the screening is applied also to conductors 36 connected to the upper electrode 13. This screening can be provided advantageously by means of a screen 37 fitted to the upper electrode arm 38. FIG. 7 also shows optical means 40 for detecting the position of the electric arc.

It should be borne in mind that the conductors 32-36 should always be insulated electrically from the section 33-37 which acts as a screen since the sections 33-37 generally consist of magnetic steel.

What is claimed is:

1. Direct-current smelting furnace with control of deflection of electric arc formed therein, which comprises:
    a furnace hearth;
    an upper electrode connected to a relative power return-flow line;
    a plurality of bottom electrodes positioned on the hearth of the furnace and arranged in two or more assemblies, each assembly having its own controlled supply conductor line connected to its own transformer, there being included downstream of each transformer its own thyristor rectifier assembly associated with its own controlling means to control voltage, current and firing angle; and screens formed of magnetic sections for at least partly screening at least said controlled supply conductor line of said each assembly of said bottom electrodes and said power return-flow line of said upper electrode in the vicinity of the smelting furnace.

2. Furnace as in claim 1, in which a calculation circuit suitable to determined an unbalance of currents in the bottom electrodes based on a signal of deflection of the electric arc is included upstream of said controlling means.

3. Furnace as in claim 1, in which the screens are included in cooperation with the bottom and upper electrodes consisting of ferromagnetic material.

4. Furnace as in claim 1, which comprises means that detect the position of the electric arc associated with means controlling and managing the electric arc with a closed-loop control system.

5. Furnace as in claim 4, in which the means detecting the position of the electric arc are optical means.

6. Furnace as in claim 4, in which the means detecting the position of the electric arc are means that detect a magnetic field.

7. Furnace as in claim 4, in which the means detecting the position of the electric arc are temperature detecting means.

8. Furnace as in claim 1, in which said controlling means to control firing angle are adjusted at a beginning of smelting and correct themselves substantially continuously.

9. Furnace as in claim 1, in which said controlling means to control firing angle are adjusted at a beginning of smelting and take corrective action periodically to correct the firing angle.

10. Furnace as in claim 1, in which said controlling means to control firing angle take corrective action at differentiated moments of smelting cycle with differentiated adjustments.

11. Furnace as in claim 1, in which said controlling means to control firing angle of the thyristor rectifier assembly in a way as to displace the electric arc in a controlled manner substantially along at least one circumference having the upper electrode as its axis.

* * * * *

UNITED STATES PATENT AND TRADEMARK OFFICE
CERTIFICATE OF CORRECTION

PATENT NO.   : 5,383,218
DATED        : January 17, 1995
INVENTOR(S)  : Bergman et al It is certified that error appears in the above-identified patent and that said Letters Patent is hereby corrected as shown below:

On the title page: Item [73] Assignee's:
--Danieli & C. Officine Meccaniche SpA.--

Signed and Sealed this

Twenty-fifth Day of April, 1995

Attest:

BRUCE LEHMAN

Attesting Officer

Commissioner of Patents and Trademarks